United States Patent Office 2,975,899
Patented Mar. 21, 1961

2,975,899

SCREENING DEVICE

Madison M. Cannon, Wellesley, Mass., George M. Dick, Sherbrooke, Quebec, Canada, and Salomon M. Salomon, Sharon, Mass., assignors to Bird Machine Company, South Walpole, Mass., a corporation of Massachusetts Filed Apr. 16, 1957, Ser. No. 653,197

10 Claims. (Cl. 209—273)

This invention relates to a screening device for liquid suspension and pertains more particularly to a screening device particularly for use with suspensions of fibers or other solid particles.

The device of the present invention is an improved screening device of the type which is provided with means to progressively clean the face of the screen for the purpose of lifting an accumulated mat of oversized material accumulating on the face of the screen which clogs the apertures through which the accepted suspension is adapted to pass.

One object of the present invention is to provide a device of the type described in which is included a slot-like chamber in which opposite walls are provided with screen surfaces, an inlet being provided for the pulp suspension so arranged that the flow is across the face of the screen from one end toward the end at which a waste outlet is provided to carry away the rejected portion of the suspension.

Another object is to provide an improved means for progressively cleaning the surface of the screens.

Still another object is to provide a device in which the stream of liquid suspension is introduced uniformly into the screen chamber.

A further object is to provide a device in which the cleaning action is produced with a minimum of turbulence of the suspension during the screening operation.

Still another object is to provide an improved screen of the type described which provides large screen area in compact form.

Other and further objects will be apparent from the drawings and the following description.

In the screening of liquid suspension of fibrous material, one of the chief problems is, of course, to keep the screen from clogging, and this has been attempted in a variety of ways, both mechanically and hydraulically.

In accordance with the practice of this invention, it is proposed to introduce liquid suspension into a slot provided with opposed screen surfaces and to clear these surfaces of accumulated unscreenable material and thus to present clean screen faces to the fresh liquid suspension. While in the preferred embodiment of the invention the opposed screen surfaces are uniformly spaced apart throughout their extent, the spacing (i.e., width of the slot) is not critical and may vary considerably from one part of the screens to another. By liquid suspension is meant liquid which contains in suspension particles or fibers of various sizes, some adapted to pass the screen and others to be rejected. There is a tendency of this material to accumulate on the screen surfaces as the large particles clog the holes in the screens. If proper screening is to be had, it is necessary to loosen such material to unclog the screens.

Figure 1:
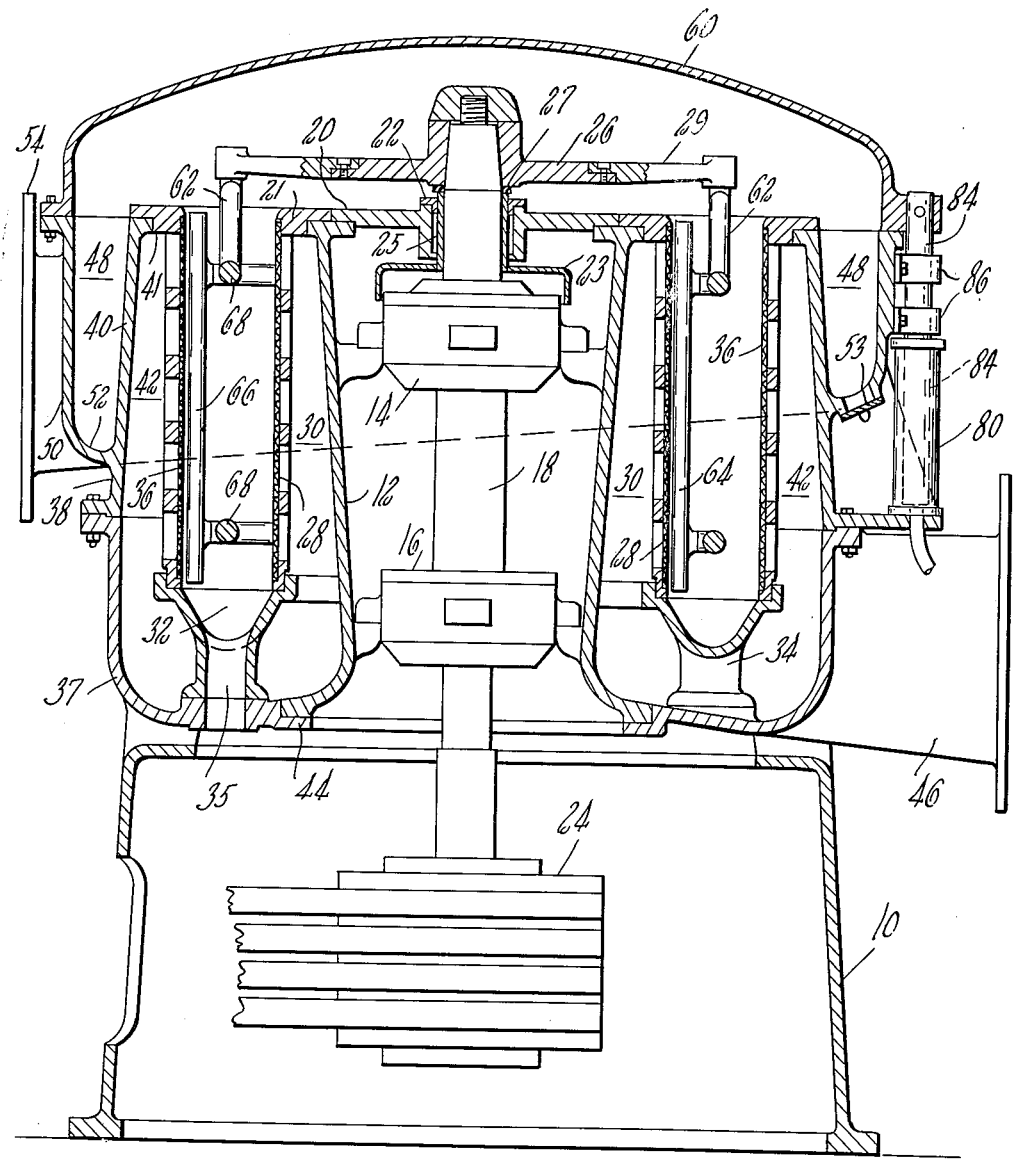
Fig. 1 is a view in vertical cross section of one embodiment of the present invention taken along line 1—1 of Fig. 2.
Figure 2:
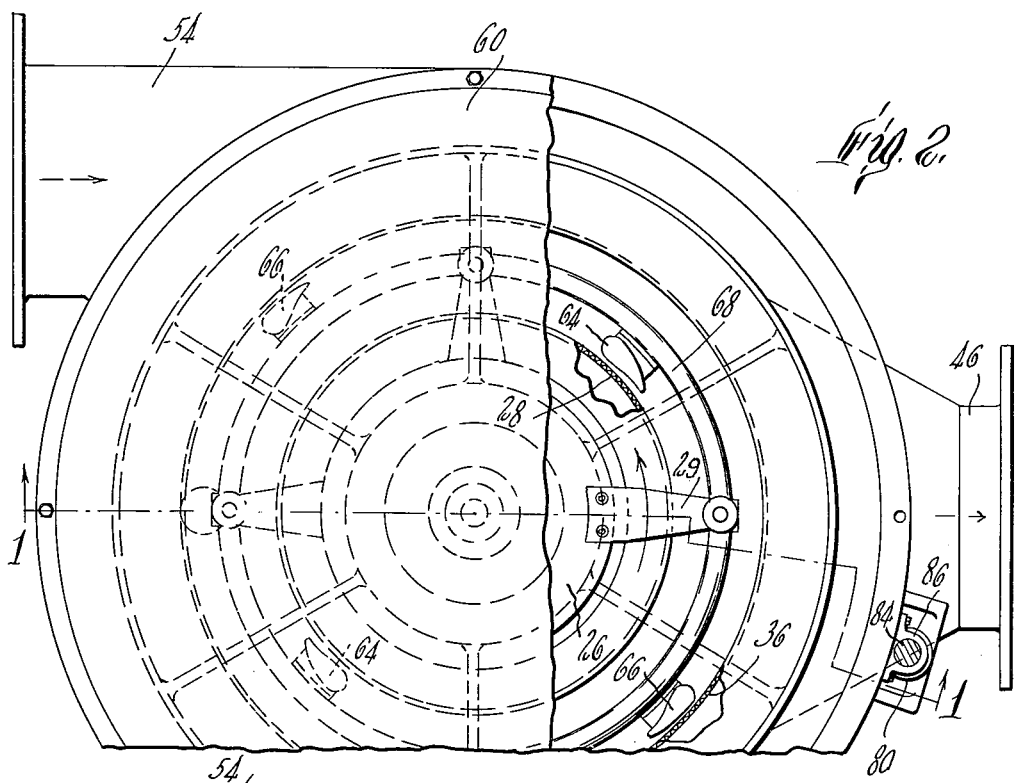
Fig. 2 is a plan view, partly broken away and in section of the embodiment shown in Fig. 1.

In the preferred embodiment of the invention, which is shown in Figs. 1 and 2 of the drawings, there is included a main frame 10 on which is mounted a hollow inner housing 12, preferably cylindrical, within which are supported main journal bearings 14, 16 in which is journaled a drive shaft 18. The upper end of housing 12 is sealed by a closure 20 which is provided with a stuffing box 22 through which shaft 18 projects. Stuffing box 22 serves to seal the space above closure 20 from the space within housing 12. In addition, flinger plate 23 mounted on sleeve 25 is fixed to shaft 18 beneath stuffing box 22 to protect bearings 14, 16 from any water which may leak through the stuffing box.

Fixed to the lower end of shaft 18 is a multiple V-belt pulley 24 which may be driven by means of a conventional belt drive from any suitable source of power such as an electric motor (not shown). Fixed to the upper end of shaft 18 is a hub 26, a soft rubber collar 27 being compressed between hub 26 and the end of sleeve 25 to prevent leakage. Bolted to the margin of hub 26 is a spider 29 the projecting arms of which serve to support and drive the foils or vanes hereinafter described.

The slot above referred to is in this case formed by two cylindrical screens 28 and 36 concentric with each other and with the shaft 18. The inner screen 28 is supported from the upper end of housing 12 at flange 21 extending radially outwardly from the upper end of the housing, the inner screen 28 forming one wall of inner receiver chamber 30 into which the screen discharges.

An annular channel 32 of U-shaped cross-sectional configuration is located at the bottom margin of inner screen 28 and is supported by a plurality of legs 34. One leg is hollow serving as an outlet 35 leading to waste. The outer screen 36 is mounted on the outer wall of channel 32. Screens 28 and 36 form a generally annular screen chamber or slot which is open at its upper end throughout its extent.

A generally cylindrical imperforate wall 37 concentric with and spaced outwardly from outer screen 36 is supported by main frame 10. An extension 38 is bolted to the upper margin of wall 37 forming wall 40 and is provided with flange 41 at its upper end to support screen 36 and to form therewith a second generally annular receiver chamber 42. Bottom wall 44 spaced below the bottom of trough 32 seals the lower ends of receiver chambers 30 and 42 and conducts material from the receiver chambers to main outlet 46 for the accepted stock.

Mounted externally of outer receiver chamber 42 is an annular distributor chamber 48 having an imperforate outer wall 50 and bottom 52 integral with extension 38. Mounted tangentially of distributor chamber 48 is inlet 54 for the liquid suspension to be screened. A lid 60 bolted to the upper margin of outer wall 50 covers all of the space within said wall. It will be understood that wall 37 together with outlet 46 may be rotated as a unit with respect to extension 38 and inlet 54 before wall 37 and extension 38 are bolted together, thus adjusting the direction of inlet 54 and outlet 46 as desired.

The arms of spider 29 extend radially outwardly above the space between screens 28 and 36 and from their ends depend hangers 62 and foils or vanes 64, 64, 66, 66, each of which is of streamlined cross-sectional configuration, each of foils 64, 64 being disposed adjacent the face of inner screen 28 and each of foils 66, 66 being disposed adjacent the face of outer screen 36. Reinforcing and spacing rings 68, 68 are secured to the foils adjacent their upper and lower ends and serve to maintain the foils in the desired alignment. The clearance between the foils and their respective screens is not critical and may be of the order of 0.03 to 0.50 inch or even more.

In order to facilitate removal of lid 60 for purposes of inspection or the like, a hydraulic cylinder 80 is secured to outer wall extension 38. Piston 84 seats in cylinder 80 and is secured at its upper end to the margin of lid 60, piston 84 being journaled in bearings 86, 86 mounted on outer wall 50. Suitable conventional means for supplying hydraulic fluid under pressure to cylinder 80 and for exhausting said fluid therefrom is provided. Accordingly, when the bolts which secure lid 60 to outer wall 50 are removed, hydraulic fluid is supplied to cylinder 80 to lift lid 60 clear of wall 50, whereupon it may be rotated with piston 82 as an axis to permit access to the interior of the device. The procedure may be reversed to close the device.

It will be appreciated that spider 29 may be unbolted from hub 26 and removed along with its associated vanes or foils without disturbing shaft 18 or its bearings 14, 16. After removal of spider 29, inner screen 28 may be lifted out for inspection, repair, or replacement. Outer screen 36 may be removed without disturbing spider 29.

In operation of the device, a stream of the liquid suspension such as paper stock is introduced under pressure through inlet 54, the stock flowing tangentially around through distributor chamber 48 and overflowing the upper edge of wall 40 which facilitates uniform distribution of the flow throughout the circumferences of the screens, thence across the top of annular receiver chamber 42 and downwardly into the space between screens 28, 36, the paper stock continuing to flow tangentially as it enters this space. Distributor chamber 48, in addition to distributing the liquid suspension, also serves to trap and remove from the suspension very heavy particles of solid matter. A clean out port 53 may be provided in bottom 52 to permit this material to be removed.

Preferably, the foils or vanes 66 are shaped so as to present a streamlined cross-sectional configuration having a smoothly rounded front merging into a tapering tail to avoid unnecessary turbulence which might cause a loss of power and efficiency.

Due to the narrowness of the screen chamber or slot between the screens 28 and 36, the vanes can act more effectively on the liquid suspension since the latter will move in a generally organized way both in a circular direction as well as vertical toward the waste outlet 35. The motion in the latter direction is further facilitated by the fact that the screens are disposed vertically and advantage is taken of gravity and the general flow in the direction of that portion of the screen remote from the inlet.

Shaft 18 is rotated counter-clockwise, as seen in Fig. 2, by the drive belts, carrying with it hub 26, spider 29, and foils 64, 64, 66, 66 which sweep across the faces of screens 28, 36 and by their motion are believed to produce a localized zone or area of reduced pressure adjacent their thickest portion. The foils may move at a linear speed of the order of 25 to 60 feet per second.

It is believed that the pulse of reduced pressure produced at the face of the screen as the vane passes it, together with the turbulence accompanying the passage of each vane through the liquid suspension, produces the desired removal of clogging or obstructing particles from the screen face.

Rejected material not passed through the screen is, of course, carried downwardly toward waste opening 35 while the accepted suspension which passes through the screens 28, 36 is collected in receiver chambers 30, 42 and conducted to the main outlet 46.

Figure 3:
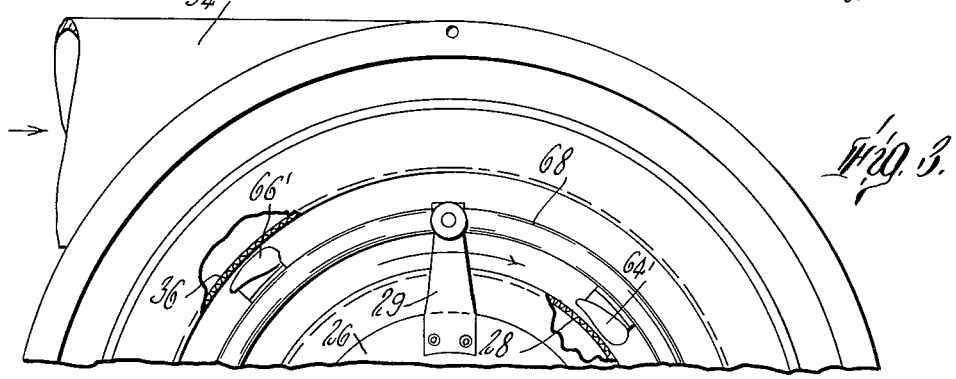
Fig. 3 is a partial plan view, partly broken away and in section, showing another embodiment of the invention.

If desired the foils 64', 66' may be reversed in position and the direction of rotation of shaft 18 may also be reversed as indicated in Fig. 3 so that the vanes, instead of rotating opposite to the direction of flow of suspension through inlet 54, rotate in the same direction as the flow through the inlet. Under conditions of opposite or counter-rotation when the pulp suspension flows through inlet 54 at a linear speed of about 10 feet per second, it will be found that the speed of rotation of shaft 18 may be substantially reduced with a consequent substantial reduction in the power required to drive it without any appreciable decrease in the pressure drop adjacent each foil 64, 66.

Figure 4:
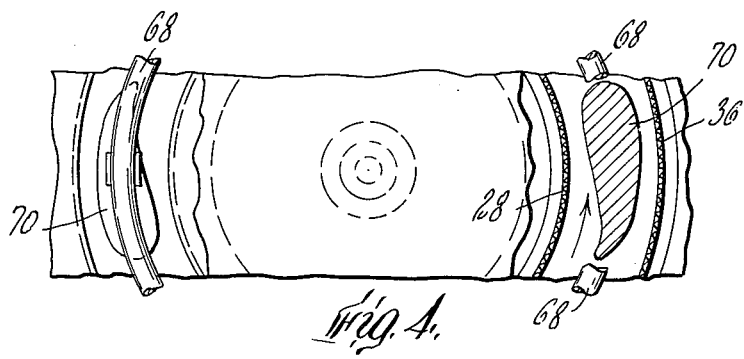
Fig. 4 is a partial plan view, partly broken away and in section, showing still another embodiment.

Still another embodiment is shown in Fig. 4 in which the foils or vanes 70, 70 are located midway between screens 28, 36 and act equally on both screens. In this embodiment the clearance between each foil and the screens may be considerably greater, up to as much as one inch or more, depending upon the distance between the screens and the chord thickness of the foils.

It will be appreciated that in the improved construction of the present invention the drive shaft and its bearings are sealed from contact with the liquid suspension in central housing 12 and the spider 29 is located above the space between screens 28, 36. This arrangement minimizes disturbance of the flow pattern in the space between the screens and consequently the problems of turbulent agitation of the suspension during the screening operation, and thus facilitates passage of the rejected portion to waste. Similar results can be obtained by rotating screens 28, 36 while maintaining the foils or vanes stationary.

If desired, inner screen 28 may differ from outer screen 36 in the size and/or shape of its openings, and separate outlets may be provided for inner receiver chamber 30 and outer receiver chamber 42, thus permitting classification or fractionation of the suspension.

Although specific embodiments of the invention have been described herein, it is not intended to limit the invention solely thereto, but to include all of the obvious variations and modifications within the spirit and scope of the appended claims.

We claim:

1. A screening device comprising inner and outer concentric, spaced, cylindrical screens, inlet means for introducing a stream of liquid suspension under pressure between said screens adjacent one end thereof, at least two vanes of streamlined cross-sectional configuration having a smoothly rounded front merging into a tapering tail extending into the space between said screens, at least one of said vanes being adjacent to the face of one screen only and at least one other of said vanes being adjacent to the face of the other screen only, said vanes being mounted for rotation in one direction with respect to said screens about the axis of said screens, drive means for rotating said vanes relative to said screens about said axis at a speed sufficient to produce an area of reduced pressure between each said vane and the adjacent screen portion, a pair of generally annular chambers, one disposed outside of the outer screen and one disposed within said inner screen, arranged to receive suspension passing through said screens, means for withdrawing screened suspension from said chambers, and means for withdrawing rejected material from the space between said screens at the end opposite to said inlet.

2. A screening device comprising inner and outer concentric, spaced, cylindrical screens, inlet means for introducing a stream of liquid fibrous suspension under pressure between said screens adjacent one end thereof, a plurality of vanes of streamlined cross-sectional configuration shaped to reduce turbulence extending into the space between said screens and mounted for rotation about the axis thereof, at least one of said vanes being adjacent to the face of one screen only and at least one other of said vanes being adjacent to the face of the other screen only, drive means for rotating said vanes about said axis in one direction at a speed sufficient to produce an area of reduced pressure between each said vane and an adjacent screen portion, a pair of generally annular chambers one disposed outside of the outer screen and one disposed within said inner screen, arranged to receive suspension passing through said screens, means for withdrawing rejected material from the space between said screens at the end opposite to said inlet, and means for withdrawing accepted suspension from said annular chambers.

3. A screening device as defined in claim 2 in which said drive means includes a shaft mounted for rotation in one direction concentrically within said screens and said annular chambers, and means rigidly connecting said shaft with said vanes adjacent one end of the space between said screens.

4. A screening device as defined in claim 3 in which said inlet means and the means connecting said shaft and said vanes are both located adjacent the same end of the space between said screens.

5. A screening device for liquid suspensions comprising inner and outer generally vertical, concentric, spaced, cylindrical screens, a pair of generally annular receiver chambers, one disposed outside of the outer screen and the other disposed within said inner screen, arranged to receive suspension passing through said screens, an annular distributor chamber surrounding the receiver chambers sealed therefrom and communicating with the upper end of the space between said screens over the upper edge thereof, an inlet for introducing a stream of liquid suspension tangentially into said distributor chamber whereby it flows over the upper edge and downwardly into the space between said screens, a generally vertical shaft mounted for rotation in one direction concentrically within said chambers and screens, rigid support members extending radially outwardly from the upper end of the shaft over the upper end of the space between said screens, a plurality of foils secured to said support members extending downwardly into the space between said screens, said foils being of streamlined cross-sectional configuration, having a smoothly rounded front merging into a tapering tail, at least one of said foils being adjacent to the face of one screen only and at least one other of said foils being adjacent to the face of the other screen only, means for rotating said shaft and foils at a speed sufficient to produce suction between each said foil and an adjacent screen portion, means for removing rejected material from the bottom end of the space between said screens, and means for removing accepted suspension from said receiver chambers.

6. A screening device as defined in claim 5 in which the direction of rotation of said foils and shaft is the same as the direction of flow through said tangential inlet.

7. A screening device as defined in claim 5 in which the direction of rotation of said foils and shaft is counter to the direction of flow through said tangential inlet.

8. A paper stock screen device comprising inner and outer concentric, spaced, cylindrical screens defining between them a chamber of uniform annular cross-sectional shape from end to end of said screens, an inlet for introducing a stream of paper stock tangentially into said chamber adjacent one end thereof, an outlet for carrying away rejected material from the other end of said chamber, a second outlet adjacent said other end for receiving accepted stock passing through each of said screens, a plurality of clearing elements disposed in said chamber, at least one of said elements being adjacent to the face of one screen only and at least one other of said elements being adjacent to the face of the other screen only, and drive means for moving said clearing elements with respect to said screens in a circular path in one direction about the axis of said screens to enable each said element to clear the screen face adjacent to it.

9. A paper stock screen as defined in claim 8 in which each said clearing element comprises a member for producing pressure pulsations at the surface of said adjacent screen face.

10. A paper stock screen as defined in claim 9 in which said member is of streamlined cross-sectional configuration arranged to reduce turbulence.

References Cited in the file of this patent

UNITED STATES PATENTS

| Re. 24,677 | Martindale | July 28, 1959 |
| 651,621 | Black et al. | June 12, 1900 |
| 2,332,965 | Ducommun et al. | Oct. 26, 1943 |
| 2,631,728 | Popp | Mar. 17, 1953 |

FOREIGN PATENTS

| 11,163 | Great Britain | 1911 |